United States Patent

[11] 3,608,624

[72] Inventor Floyd Hasselriis
 Astoria, N.Y.
[21] Appl. No. 15,384
[22] Filed Mar. 2, 1970
[45] Patented Sept. 28, 1971
[73] Assignee American Hydrotherm Corporation

[54] HEATING SYSTEM
 16 Claims, 4 Drawing Figs.
[52] U.S. Cl. ........................................ 165/1,
 165/39, 165/107
[51] Int. Cl. ...................................... B60h 1/00
[50] Field of Search ........................... 165/1, 2,
 39, 40, 107, 26, 22, 12

[56] References Cited
UNITED STATES PATENTS
3,109,486 11/1963 Hansen ..................... 165/22
3,259,175 7/1966 Kraus et al. ................ 165/12
3,525,098 8/1970 Vox ........................... 165/2

Primary Examiner—Charles Sukalo
Attorney—Marn & Jangarathis

ABSTRACT: An industrial heating system, in particular a system for providing high-temperature high-pressure water to the mold cavity of a tire press, to maintain desired temperature conditions during a curing cycle. A single accumulator provides the high temperature water requirements and in a typical cycle the mold cavity is filled with high temperature water from the accumulator, preferably through a separate fill line under the driving force of high pressure steam which also maintains the desired water fill temperature. During the curing, water is pressurized and circulated through the mold cavity and returned to a gas-liquid separator to provide for continuous degasification of the water. The temperature of the liquid is maintained at the desired operating temperature by splitting the flow of water from the gas-liquid separator between the accumulator and the mold cavity, with there being an increase in flow to the accumulator in response to a decrease in temperature below the desired operating temperature to provide additional high temperature water to the circulating system and vice versa.

Fig. 1.

INVENTOR.
Floyd Hasselriis
BY
Mann & Jangarathis
ATTORNEYS

Fig. 2.

HEATING SYSTEM

This invention relates to a heating system and more particularly to a system for providing high temperature, high pressure water for curing rubber products, such as tires, belting and hose.

In many industrial processes, a closed heating system is an important aspect of the overall process. Thus, for example, in the production of rubber products, a steam generation system provides steam to both directly heat the rubber during the curing cycle and press the rubber into a mold. The use of steam limits the overall process in that steam pressure and temperature are directly related and, therefore, many processes employ a hot water heating system in that in such a system the temperature and pressure of the water may be separately regulated.

In the curing and molding of rubber products with high-temperature high-pressure water, the mold cavity containing an uncured rubber piece is filled with high-temperature water and then high-pressure high-temperature water is continuously circulated through the mold to maintain the desired curing temperature. After completion of the curing cycle, which may require several different operating temperatures, water is drained from the cavity and the mold cavity is opened to both withdraw the finished product and insert an uncured rubber piece for the next cycle.

The overall curing cycle necessitates close temperature control to permit operation at preferred conditions, and in general, the systems heretofore employed in the art do not provide such strict temperature control at the various temperatures required during the curing cycle. In addition, much heat is lost during both the changing of temperature levels during the curing cycle and the draining and refilling of the molds between cycles. Furthermore, the molds are generally provided with rubber bags or bladders to separate the product being cured from the high-temperature high-pressure water, and in the prior art systems, the air which enters the mold during opening and closing thereof, is dissolved in the circulating water and such dissolved air caused rapid deterioration of the rubber bag or bladder.

Accordingly, an object of this invention is to provide an improved liquid heating system.

Another object of this invention is to provide a system for providing high-temperature high-pressure water for a rubber-molding process.

A further object of this invention is to provide for heat savings in a high-temperature high-pressure water system.

Yet another object of this invention is to provide for improved temperature control and water degasification in a system for providing high-temperature, high-pressure water for molding rubber products.

These and other objects of the invention should be readily apparent from the following detailed description of the invention when read with reference to the accompanying drawings wherein:

The objects of this invention are broadly accomplished in one aspect, by providing a system for supplying high temperature liquid to user equipment which continuously degasifies the circulating liquid and maintains strict temperature control over the liquid being supplied to the user equipment. In another aspect, the objects of this invention are accomplished by providing a system for supplying high-temperature high-pressure water to rubber molding presses which includes continuous degasification of the circulating water, strict temperature control over the water supplied to the press and means for saving and reusing the water, without loss of heat.

The invention will be further described with respect to embodiments thereof illustrated in the accompanying drawings. It is to be understood, however, that such embodiments are only illustrative of the invention and therefore the scope of the invention is not to be limited thereby.

Figure 1:
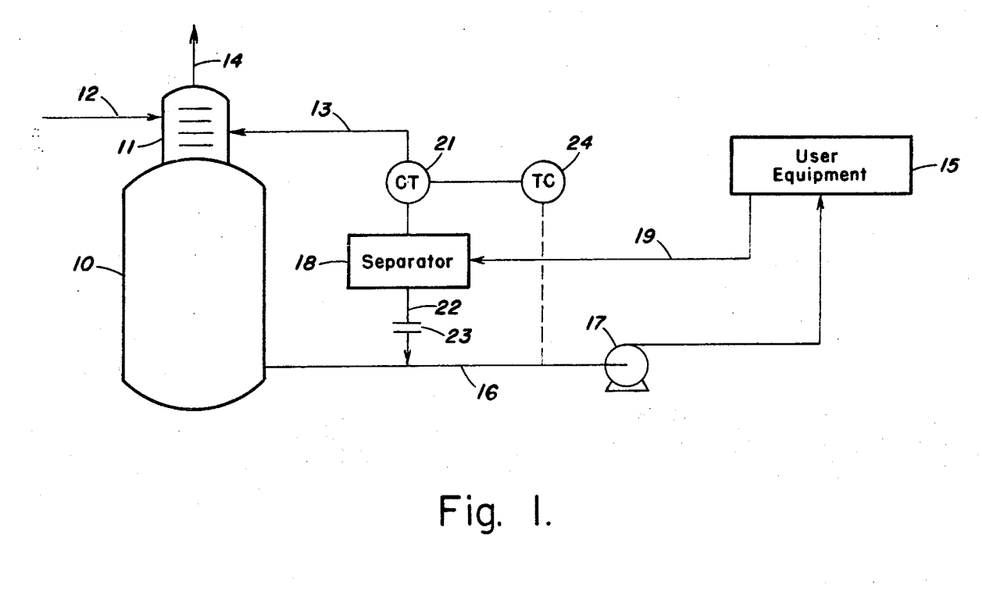
FIG. 1 is a diagrammatic showing of an embodiment of the heating system of the invention.

Referring now to FIG. 1 the systems for providing a high-temperature liquid includes a vessel 10 for storing and heating liquid, the upper portion of which contains a degasifying section 11, provided with suitable trays and operated as generally known in the art.

The degasifying section 11 is provided with an inert conduit 12 for introducing makeup liquid into the vessel 10, a conduit 13 for returning liquid from user equipment, as hereinafter described, and a gas outlet conduit 14.

The lower portion of vessel 10 is connected to the inlet of user equipment, schematically indicated as 15, through conduit 16 which includes a pump 17 and the outlet of the user equipment 15 is connected to the inlet of a gas-liquid separator 18, of a type known in the art, through conduit 19. The gas-liquid separator is connected to the degasifying section 11 of vessel 10 through conduit 13 which includes a flow control valve 21 and to the suction side of pump 17 in conduit 16 through conduit 22, the conduit 22 including a suitable flow restrictor such as an orifice or valve, preferably an orifice, schematically indicated as 23.

The control portion of valve 21 is operatively connected to a temperature controller 24 which is responsive to the temperature of the liquid being provided to the user equipment 15 in conduit 16. The temperature controller 24 is set to maintain a predetermined liquid temperature for the d being provided to the user equipment 15 through conduit 16 by further opening valve 21 in response to a decrease of the liquid temperature below the predetermine value and further closing valve 21 in response to an increase of the liquid temperature above the predetermined value. The further opening of the valve 21 increases the amount of liquid returned to vessel 10 through conduit 13 which displaces a corresponding amount of heated liquid from vessel 10 into conduit 16, thereby increasing the overall temperature of the liquid being introduced into the user equipment 15. Similarly, the further closing of the valve 21 decreases the amount of liquid returned to vessel 10 through conduit 13 resulting in a corresponding decrease in the amount of heated liquid displaced from vessel 10 and a corresponding increase in the amount of cooler return liquid passed through conduit 22, which decreases the overall temperature of the liquid introduced into the user equipment 15 through conduit 16. The control valve 21 and temperature controller 24 are designed so that throughout the operation of the system, the control valve 21 is never in a fully closed position, thereby providing continuous degasification of the circulating liquid.

The hereinabove described system provides for continuous temperature control and degasification of a circulating heating liquid for user equipment, and such a system is particularly suitable for providing high-temperature high-pressure water to the mold cavity of a rubber molding press, such as a press for molding tires, as hereinafter described with reference to FIG. 2.

Figure 2:
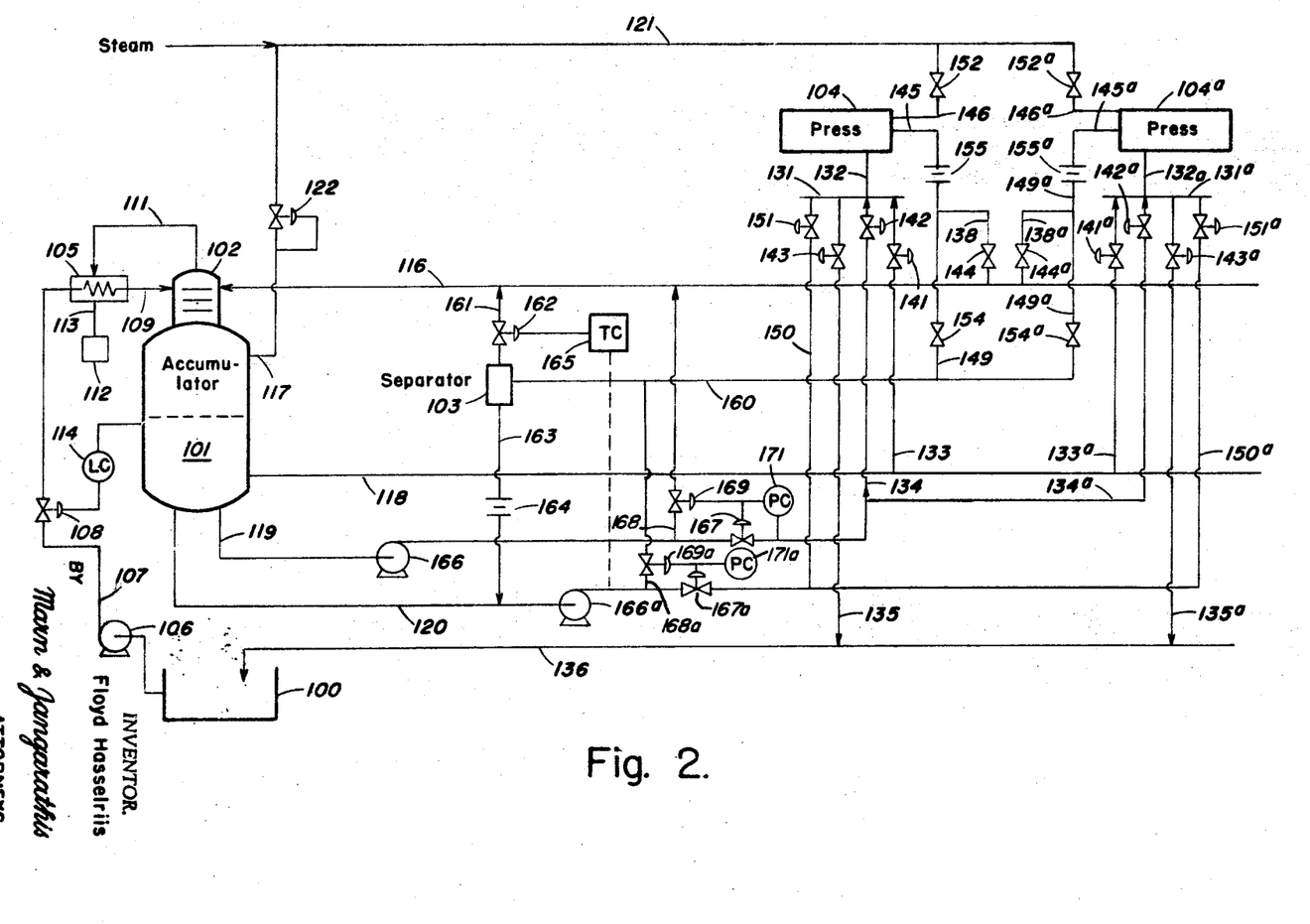
FIG. 2 is a diagrammatic showing of an embodiment of the heating system of the invention for providing a rubber-molding press with high-temperature, high-pressure water.

Referring now to FIG. 2, the principle element of the water system includes: a drain sump 100; a vessel 101 for storing and heating water, the upper portion of which contains a degasification section 102 provided with suitable trays or the like for deaerating the water; a gas-liquid separator 103; and two tires presses, schematically indicated as 104 and 104a, and presses 104 and 104a generally being of a type wherein a rubber bag or bladder separates water circulating through the mold cavity from the piece being cured. It is to be understood that two tire presses are shown for purposes of illustration only and the exact number of presses employed is dependent upon the requirements of a given plant..

The sump 100 is connected to the inlet of the tube side of a vent condenser 105 through pump 106 and piping 107 containing a flow control valve 108 and the outlet of the tube side of the vent condenser 105 is connected to the degasifying section 102 of vessel 101 through conduit 109. The inlet of the shell side of vent condenser 105 is connected to the gas outlet portion of the degasifying section 102 of vessel 101 through conduit 111 and the outlet of the shell side of vent condenser 105 is connected to a condensate trap and gas vent 112 through conduit 113. The vent condenser 105 functions to both condense water from the vent gases from the degasifying section 102 of vessel 101 and preheat makeup water for the overall system. The amount of makeup water introduced into the vessel 101 is controlled by valve 108 which is operated by level controller 114 in vessel 101. The level controller 114 is preferably a variable level controller which further opens valve 108 in response to decreases in the liquid level on vessel 101 is provided with a conduit 116 for returning water from the tire presses 104 and 104a; the upper portion of vessel 101 is provided with an inlet conduit 117 for introducing steam; and the lower portion of vessel 101 is provided with a fill conduit 118 for filling gasses 104 and 104a and supply conduits 119 and 120, each supplying pressurized water to the presses 104 and 104a, at two different temperature levels, as hereinafter described. The steam inlet conduit 117 is connected to a high-pressure steam line 121 and is provided with a control valve 122 to maintain a predetermined steam pressure, and therefore a predetermined water temperature in vessel 101; i.e., the saturation temperature of the water at the maintained pressure. The steam pressure is selected to provide the water temperature most preferred for filling the mold cavity of the tire press and the steam may also be employed as a driving force for initially filling the tire presses 104 and 104a with water, as hereinafter described.

The mold cavities of the tire presses 104 and 104a are connected to manifolds 131 and 131a through conduits 132 and 132a and the manifolds 131 and 131a are connected to: the fill conduit 118 through branch conduits 133 and 133a; the supply conduit 119 through branch conduits 134 and 134a; the sump 100 through branch conduits 135 and 135a and drain conduit 136; and the supply conduit 120 through branch conduits 150 and 150a. The branch conduits 133 and 133a; 134 and 134a; 135 and 135a; and 150 and 150a are provided with valves 141 and 141a; 142 and 142a; 143 and 143a; and 151 and 151a, respectively. The tire presses 104 and 104a are also connected to: the high-pressure steam line 121 through branch conduits 146 and 146a; the gas-liquid separator 103 through branch conduits 149 and 149a and return conduit 160; and the save line 116 through branch conduits 138 and 138a, the branch conduits 146 and 146a; 149 and 149a; and 138 and 138a, including suitable valves 152 and 152a; 154 and 154a; and 144 and 144a, respectively, and the branch conduits 149 and 149a further include flow controllers 155 and 155a, such as an orifice, valve or the like, preferably an orifice, the flow controller being set to provide the desired rate of flow at the operating pressures.

The gas-liquid separator 103 is connected to the save conduit 116 through conduit 161, the conduit 161 including flow control valve 162 and to supply conduit 120 through conduit 163, the conduit 163 including flow restrictor 164, such as an orifice or valve, preferably an orifice, to insure flow through conduit 161. The control portion of the flow control valve 162 is operatively connected to temperature controller 165 which is responsive to the temperature of the liquid in supply conduit 120 which is to be introduced into the presses 104 and 104a through branch conduits 150 and 150a and the temperature controller 165 functions to maintain a predetermined temperature for the fluid to be supplied to the mold cavities of the presses 104 and 104a, as hereinafter described.

The supply conduits 119 and 120 are provided with pumps 166 and 166a for raising the pressure of the water therein, with the low pressure side of the pump 166a being connected to the junction of conduits 163 and 120. The supply conduits 119 and 120 include valves 167 and 167a and are connected to branch conduits 168 and 168a, provided with valves 169 and 169a, which connect the supply conduits 119 and 120 with the save conduit 116 and return conduit 160, respectively, the valves 169 and 169a and branch conduits 168 and 168a both being located between the high pressure side of pumps 166 and 166a and the junction of supply conduits 119 and 120 with branch conduits 134 and 150, respectively. The control portions of valves 167 and 167a and 169 and 169a, respectively, are connected to pressure controllers 171 and 171a which are responsive to the pressure of the water in supply conduits 119 and 120 downstream of valves 167 and 167a, the pressure controllers 171 and 171a functioning to maintain the pressure at the selected header operating pressure.

In operation, the mold cavities of presses 104 and 104a are filled with high-pressure steam from steam line 121 through conduits 146 and 146a and manifold 145 to shape and form the rubber bags in the molds of presses 104 and 104a and then hot water from vessel 101, which is maintained at the selected fill temperature by controlling the pressure of the steam introduced into vessel 101 from steam line 121 through conduit 117 under the control of valve 122. High temperature water is rapidly introduced into the presses 104 and 104a through fill conduit 118 under the driving force of the steam in vessel 101 to bring the pressure in the mold cavity of presses 104 and 104a to the pressure of the vessel 101.

After pressurizing, the curing cycle is initiated and this cycle requires continuous circulation of high-temperature, high-pressure water through the presses 104 and 104a. Thus, valves 141 and 141a are closed and valves 144 and 144a are opened, and hot water is introduced into the presses 104 and 104a through supply conduit 119, branch conduits 134 and 134a, manifolds 131 and 131a and conduits 132 and 132a under the action of pump 166. The pressure in branch conduits 134 and 134a is the operating pressure of the pump 166 reduced and controlled by control valve 167 or 169 or a combination of both, according to a signal from pressure controller 171 which senses the pressure in branch conduits 134 and 134a and compensates for any variations in such operating pressure to thereby maintain a substantially constant pressure in the conduits 134 and 134a. The temperature of the water in branch conduits 134 and 134a is the water temperature in the accumulator 101, which is controlled as hereinabove described.

The water is withdrawn from presses 104 and 104a through flow controllers 155 and 155a, branch conduits 138 and 138a and is returned through save conduit 116 to the degasifying section 102 of accumulator 101 to separate any gases therefrom. The controllers 155 and 155a maintain the desired flow for the pressure difference across pump 166, with the reduction of pressure across controllers 155 and 155a aiding in the release of dissolved gases from the circulating water.

After operating at the temperature of the water in the accumulator, the curing cycle may require a second and lower operating temperature and this operating temperature is maintained by supplying water to the presses 104 and 104a through supply conduit 120. In operating the curing cycle at the second temperature only valves 151 and 151a associated with presses 104 and 104a are opened, and hot water is introduced into the presses 104 and 104a through supply conduit 120, branch conduits 150 and 150a is the operating pressure of the pump 166a reduced and controlled by valve 167a or 169a or a combination of both, according to signals from pressure controller 171a which sense the pressure in branch conduits 150 and 150a and compensates for any variations in such operating pressures to thereby maintain a substantially constant pressure in conduits 150 and 150a. The water is withdrawn from presses 104 and 104a through manifolds 145 and 145a and passes through the flow controllers 155 and 155a in branch conduits 149 and 149a, the controllers 155 and 155a in branch conduits 149 and 149a, the controllers 155 and 155a maintaining the desired flow for the pressure difference across pump 166a. The reduction of pressure across flow controllers 155 and 155a also enhances the release of dissolved gases from the circulating water.

The gas-liquid mixture in branch conduits 149 and 149a is passed through return conduit 160 and introduced into the gas-liquid separator 103 to separate the gas from the main portion of the circulating water stream.

The main portion of the circulating water is withdrawn from separator 103 through conduit 163 and recirculated to the supply conduit 120 through the flow restrictor 164, the flow restrictor 164 maintaining the pressure in separator 103, thereby permitting liquid flow through conduit 161.

A minor portion of the circulating water and the separated gas is withdrawn from the separator 103 through conduit 161, under the control of valve 162 and is introduced into the degasifying section 102 of vessel 101 through save conduit 116. The return of the water to vessel 101 through save conduit 116, results in a corresponding amount of high temperature water being withdrawn from vessel 101 through supply conduit 120 for circulation to the tire presses 104 and/or 104a.

The temperature of the circulating water in the supply conduit 120 on the high pressure side of pump 166a is maintained at a predetermined temperature by temperature controller 165. The temperature controller 165 senses the temperature of the water in the high pressure portion of supply conduit 120 and if the temperature is below the predetermined value, the temperature controller further opens valve 162 to increase the amount of return water introduced into vessel 101, resulting in a corresponding increase in the amount of high temperature water introduced into the supply conduit 120 from vessel 101, thereby increasing the overall temperature of the circulating water. Similarly, if the temperature sensed by temperature controller 165 is above the predetermined value, the temperature controller 165 further closes valve 162 to decrease the amount of return water introduced into vessel 101, resulting in a corresponding decrease in the amount of high-temperature water introduced into the supply conduit 120 from vessel 101 and a corresponding increase in the amount of cool water recirculated through conduit 163, thereby decreasing the overall temperature of the circulating water being passed to presses 104 and 104a. It is to be understood that the flow control valve 162 is never fully closed in order to provide for continuous deaeration of the circulating water.

In switching from the first operating temperature to the second operating temperature, valves 142 and 142a are closed and valves 151 and 151a are opened, with valves 144 and 144a remaining open and valves 154 and 154a remaining closed for a predetermined period of time, whereby water in the mold cavity which is at the first and higher operating temperature is returned to the accumulator 101 through save conduit 116. After realization of this heat savings, valves 144 and 144a are closed and valves 154 and 154a are opened to thereby return water from the presses 104 and 104a to the gas-liquid separator 103, as hereinabove described.

After completion of the curing cycle, high-temperature water is returned to the vessel 101 by closing valves 151 and 151a and 154 and 154a and opening valves 152 and 152a and 144 and 144a whereby steam in line 121 enters the presses 104 and 104a through conduits 146 and 146a forcing the high-temperature water from the presses 104 and 104a through branch conduits 138 and 138a and save conduit 116 into the vessel 101. The presses 104 and 104a are only partially emptied in this manner in order to prevent steam from entering he circulating system and after such partial emptying, valves 144 and 144a and 152 and 152a are closed and valves 143 and 143a are opened, whereby the remainder of the water is flashed from the presses 104 and 104a into the sump 100 through conduits 132 and 132a, manifolds 131 and 131a, branch conduits 135 and 135a and drain conduit 136. In this manner, only a portion of the heat content of the water remaining in the presses 104 and 104a is lost by flashing of water into the sump 100.

The system hereinabove described with respect to the embodiment of FIG. 2 has numerous advantages. The placing of the vessel 101 at the intake of pump 166a results in an operating whereby the temperature of the water in vessel 101 is at a temperature which is higher than the temperature of the circulating water during a portion of the curing cycle, whereby at the initiation of the curing cycle, the tire press cavity may be filled with high temperature water to rapidly bring the mold to an elevated temperature and also operated at this temperature. Thus, the temperature at which the cavity of the tire press is to be filled and the temperature at which a portion of the curing is effected may be separately regulated. In addition, the use of steam as the motive force for filling the mold cavity, results in rapid filling at a high temperature, thereby improving the overall operating of the system.

The vessel 101 operates as a constant pressure storage for many presses at a varying volume with makeup being continuously supplied thereto. Thus, the heating system provides a continuous water source o meet the water requirements for many presses.

The overall system for providing high temperature water to the tire presses is not a completely closed system and therefore the continuous degasification of the circulating water removes dissolved air, thereby increasing the overall life of the bags used in the cavities of the presses.

Furthermore, the overall system provides for strict temperature control during the curing cycle.

The operating of the embodiment of FIG. 2 has been described with reference to two presses simultaneously operating throughout the cycle, but it is to be understood that each press supplied by the system may be operated at different portions of the overall cycle.

Figure 3:
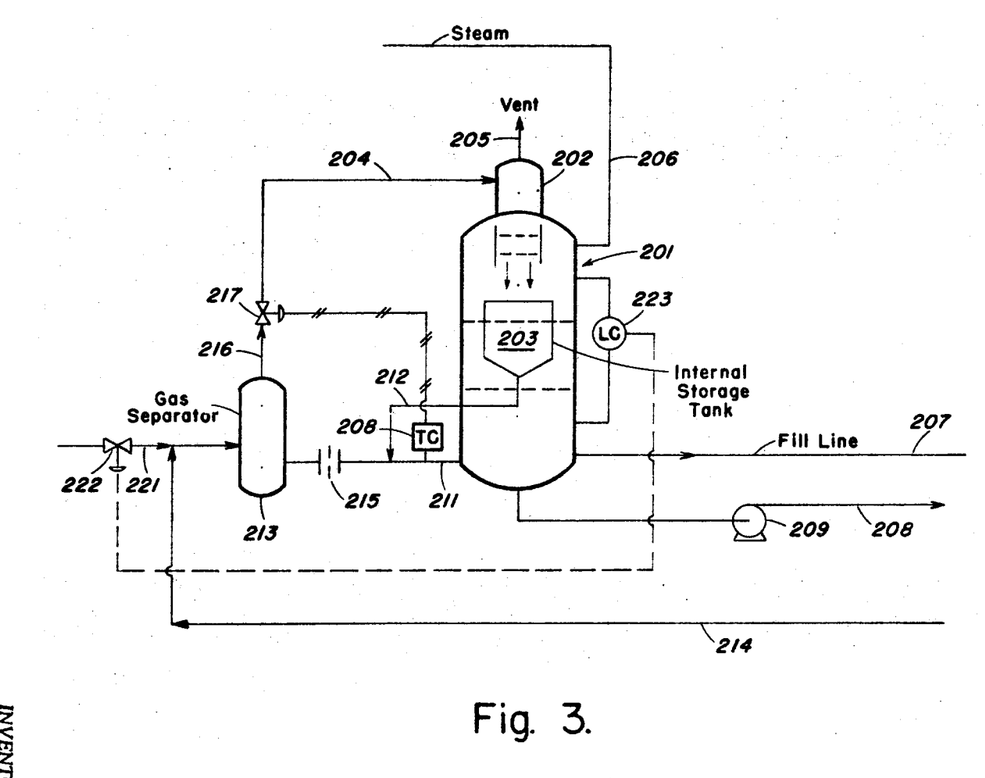
FIG. 3 is another embodiment of the heating system of the invention for providing a rubber-molding press with high-temperature high-pressure, water.

Another embodiment of the invention is illustrated in FIG. 3 which is similar to the embodiment of FIG. 2. The embodiment of FIG. 3 operates in a manner similar to the embodiment of FIG. 2 and in order to facilitate description of the embodiment only those portions of the overall system of FIG. 3 which are significantly different from the overall system of FIG. 2 are particularly illustrated.

Referring now to FIG. 3, there is shown a vessel 201 for storing high temperature water, the top of vessel 201 including a degasification section 202, provided with suitable trays or the like for deaerating water. The upper portion of vessel 201 includes an internal storage vessel 203 which encompasses substantially the entire cross-sectional area of the vessel 201 and is positioned below the deaerator and above the liquid level in storage vessel 201. The construction and positioning of the internal storage vessel 203 is such that all of the liquid from the degasification section 202 falls into the internal storage vessel 203.

The degasifier 202 is provided with an inlet conduit 204 for returning liquid from tire presses, as hereinafter described, nd a gas outlet 205. The storage vessel 201 is provided with a steam inlet line 206 to fill the upper portion of storage vessel 201 with high pressure steam; a fill line 207 for filling the mold cavities of tire presses with high-temperature water; a supply line 208, including a pump 209, for supplying the mold cavities of the pressure with high-temperature, high-pressure water during the curing cycle; and a conduit 211 for returning water from the mold cavities of the tire presses, as hereinafter described. The bottom of internal storage tank 203 is provided with a conduit 212 for connecting the internal storage tank 203 with the conduit 211.

A gas-liquid separator 213, preferably a centrifugal separator, has the inlet thereof connected to the mold cavities of tire presses (not shown) through return conduit 214; the primary liquid outlet thereof to the bottom of storage tank 201 through conduit 211, the conduit 211 including a flow restrictor 215, such as an orifice or valve; and the gas and liquid outlet thereof to conduit 204 through conduit 216, the conduit 216 including a temperature responsive control valve 217. The control portion of valve 217 is connected to a temperature controller 218 which is responsive to the temperature of the liquid in conduit 211 at a point therein between the connection of conduits 212 and 211 and the inlet to the bottom portion of storage tank 201.

The system further includes a makeup conduit 221 connected to a source of makeup water (not shown), the makeup conduit 221 including a valve 222 which is operated by a level controller 223 responsive to the liquid level in storage tank 201. The level controller 223 functions, as described with reference to the embodiment of FIG. 2, to open and close valve 222 in response to decreases and increases, respectively, in the liquid level in storage tank 201 to effect introduction of makeup water through gas-liquid separator 213 and conduit 211.

The system described with reference to FIG. 3 operates similarly to the system described with reference to FIG. 2. High-pressure steam is introduced into the upper portion of vessel 201 through line 206, and the pressure of this steam determines the temperature of the water in internal storage vessel 203; i.e., the water in internal storage vessel is at the saturation temperature of water at the prevailing steam pressure. The main body of water in storage vessel 201 is substantially at the same temperature as the temperature of the water circulating through supply conduit 208, this temperature being controlled by the temperature controller 218, as hereinafter described.

As described with reference to the embodiment of FIG. 2, the mold cavities of the tire presses (not shown) are rapidly filled with the high temperature water in storage tank 201 through fill line 207 under the driving force of the steam pressure in the upper portion of storage vessel 201. After the mold cavity is filled with the high temperature water, water is continuously circulated to the mold cavities of the tire presses from storage tank 201 through supply conduit 208, the water being pressurized to the desired operating pressure by pump 209. The circulating water is returned from the mold cavities of the tire presses (not shown) through return conduit 214 and introduced into the gas-liquid separator 213 to separate gas from the main portion of the circulating water. The main portion of the circulating water is withdrawn from separator 213 through conduit 211, including flow restrictor 215 and introduced into the bottom of storage tank 201.

A portion of the circulating water and the separated gas is withdrawn from the separator 213 through conduit 216 under the control of valve 217 and introduced into the degasification section 202 of vessel 201 through conduit 204. The water introduced into the degasification section 202 runs from the trays or the like therein into internal storage vessel 203, resulting in a corresponding amount of high-temperature water being withdrawn from internal storage vessel 203 through conduit 212 and combined with the circulating water in conduit 211 for circulation to the mold cavities of the tire presses through storage vessel 201 and supply conduit 208.

The temperature of the circulating water in the lower portion of the storage vessel 201 is maintained at a predetermined temperature by temperature controller 218. The temperature controller 218 senses the temperature of the water in conduit 211 at the inlet to storage vessel 201, and if the temperature is below the predetermined value, the temperature controller 218 further opens valve 217 to increase the amount of water returned to internal storage vessel 203 through conduits 216 and 204 and degasifier 202, resulting in a corresponding increase in the amount of high-temperature water supplied to conduit 211 from internal storage vessel 203 through conduit 212, thereby increasing the overall temperature of the circulating water introduced into the lower portion of storage vessel 201. Similarly, if the temperature sensed by temperature controller 218 is above the predetermined value, the temperature controller 218 further closes valve 217 to decrease the amount of water introduced into internal storage vessel 203, resulting in a corresponding decrease in the amount of high-temperature water introduced into conduit 212 from internal storage vessel 203, thereby decreasing the overall temperature of the water introduced into the lower portion of vessel 201. It is to be understood that during the curing cycle, the flow control valve 217 is never fully closed in order to provide for continuous degasification of the circulating water.

After the curing cycle is completed, each mold cavity is drained as hereinabove described with reference to the embodiment of FIG. 2.

As should be apparent from the description of the embodiment of FIG. 3, the operation of this embodiment differs from the embodiment of FIG. 2 in that the temperature of the fill water and the temperature of the supply water employed during the curing cycle are substantially the same, and the high-temperature water for maintaining the desired circulating water temperature is provided from a separate internal storage vessel having water at a temperature different and higher than the temperature of the main body of water in the storage tank. In other respects, the operation of and the advantages achieved with the embodiment of FIG. 3 are similar to the embodiment of FIG. 2.

In accordance with the hereinabove described embodiments of the invention, the curing cycle is operated either at the fill temperature or a single other operating temperature. It is to be understood, however, that for many operations each press may require operation at two or more temperatures during a single curing cycle, and such an operation may be accomplished in accordance with the teachings of the invention by providing a separate circulating system, including a supply conduit having a pump; a return conduit having a gas-liquid separator; a temperature controller; and associated manifolds and piping, for each temperature level other than the fill temperature to be employed in each press during a single curing cycle, all being supplied by a single storage tank or accumulator.

Figure 4:
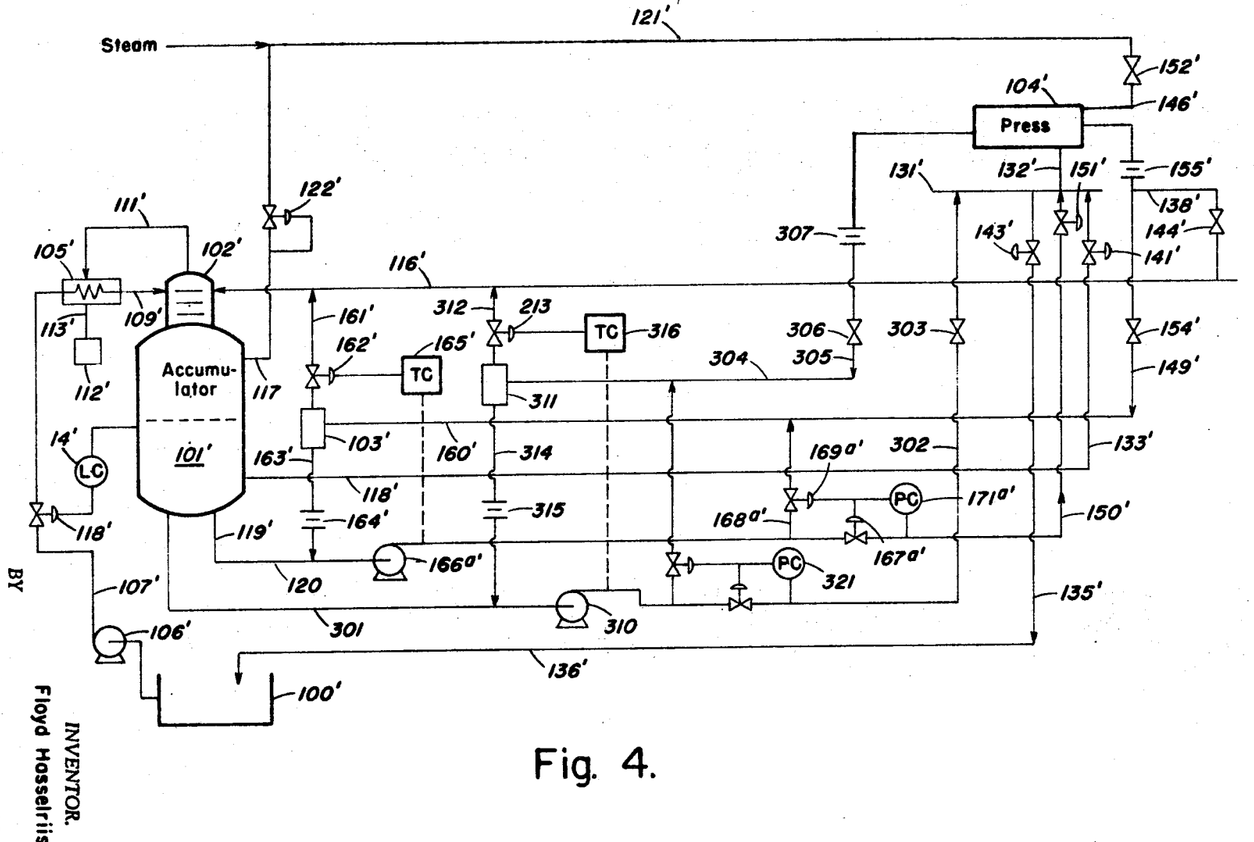
FIG. 4 is a further embodiment of the invention for providing a rubber molding press with high-temperature high-pressure water.

A system for operating at two different temperature levels other than the fill temperature during a single curing cycle is illustrated in FIG. 4 with the embodiment of FIG. 4, except for the use of an additional supply and return system and the omission of piping for continuous operation at the fill temperature, being substantially similar to the embodiment of FIG. 2, although for purposes of facilitating the description thereof only a single press is shown. In FIG. 4 those portions of the system which are identical to those of the embodiment of FIG. 2 are designated by like prime numerals.

Referring now to FIG. 4, the principle elements of the system, as described with reference to he embodiment of FIG. 2, include; a drain sump 100'; a storage vessel 101', the upper portion of which contains a degasification section 102'; a fill conduit 118'; a save conduit 116'; a tire press 104', a supply conduit 120'; a return conduit 160'; and a gas-liquid separator 103'.

In order to achieve a second operating temperature other than the fill temperature during the curing cycle, the manifold 131' of tire press 104' is connected to a second supply conduit 301 through a conduit 302 including a valve 303 and to a second return conduit 304 through a conduit 305 including a valve 306 and flow controller 307. The second supply conduit 301 is connected to the tank 101' and includes a pump 310 for raising the pressure of water circulating therein.

The second return conduit 304 is connected to the inlet of a gas-liquid separator 311, preferably a centrifugal type of separator, with the gas outlet portion of the separator 311 being connected to the save conduit 116' through conduit 312, including a flow control valve 313, and the main liquid outlet portion of the separator being connected to the low-pressure portion of the second supply conduit 301 through conduit 314 including a flow restrictor 315. The control portion of the flow control valve 313 is operatively connected to a temperature controller 316 which is responsive to the temperature of the liquid in the high pressure portion of the second supply conduit 301, with the temperature controller 316 maintaining a predetermined temperature in the high-pressure portion of the second supply conduit 301 as hereinabove described with reference to temperature controller 165' of the embodiment of FIG. 2.

The high-pressure portion of the second supply conduit 301 is further provided with a pressure control device, generally designated as 321 which operates similarly to the elements provided in supply conduit 120' for controlling the pressure therein.

The second supply and second return system operates identically to the first supply and return system, with the temperature controller 316 being set to maintain a temperature in the second supply conduit 301 which is different that the temperature maintained in supply conduit 120' by the temperature controller 165', thereby providing two different operating temperatures for the curing cycle.

Thus, for example, in a curing cycle, the mold cavity is filled with water and the curing cycle initiated at a first temperature by circulating water through the mold cavity of the press through supply conduit 120' and return conduit 160' as hereinabove described with reference to FIG. 2.

After operating at the first temperature, the curing cycle may require a second operating temperature and this operating temperature is maintained by circulating water through the cavity of the press through the second supply conduit 301 and the second return conduit 304, with the temperature being maintained at the predetermined second temperature by temperature controller 316.

In switching from the first operating temperature to the second operating temperature, valve 151' in conduit 150' is closed and valve 303 in conduit 302 is opened whereby high-temperature water is supplied to the mold cavity of press 104' through second supply conduit 301, instead of supply conduit 120'. At this point in the cycle, valve 154' in conduit 149' remains open and valve 306 in conduit 305 remains closed, whereby water in the mold cavity which is at the first operating temperature is returned through return conduit 160' in a heat savings. The valve 154' is maintained open for a predetermined period of time to realize such heat savings, and then valve 154' is closed and valve 306 in conduit 305 is opened, whereby water is circulated to the gas-liquid separator 311 through second return conduit 304. The temperature in the high-pressure side of second supply conduit 301 is maintained at the predetermined second operating temperature by temperature controller 316 in the manner previously described with reference to temperature controller 165'.

At the completion of the curing cycle at the second operating temperature, the mold cavity is either emptied of water, as hereinabove described with reference to the embodiment of FIG. 2, or curing continued at a third operating temperature which would be maintained by a third supply and return water circulation system supplied by storage tank 101'. As should be apparent from this description, any number of operating temperatures may be provided by adding further circulating water conduits and appropriate temperature controllers.

The embodiment described with reference to FIG. 3 may also be operated at two or more different temperature levels by providing separate supply and return conduits, including the associated gas-liquid separator and temperature controller, for each operating temperature. In such a system, the additional supply line would be connected directly to the tire press from its gas-liquid separator, instead of through the storage tank, as particularly shown for the initial supply conduit.

Numerous modifications and variations of the hereinabove described embodiments are possible within the spirit and scope of the invention. Thus, for example, the save and fill conduits may also be eliminated, with the mold cavity being initially filled through the supply conduit, although this type of system is less preferred.

As another modification, the combination degasifier and storage vessel may be replaced by two separate vessels and the liquid in the storage vessel may be heated other than as particularly described, for example by indirect heat transfer, although the use of direct heating by steam is particularly preferred.

It is also to be understood that the system of the present invention may also be employed for providing high-temperature liquids other than water, although the system is particularly suitable for providing high-temperature water.

Numerous other modifications and variations of the present invention are possible in light of the above teachings and therefore the invention may be practiced other than as particularly described.

What is claimed is:

1. Apparatus for supplying user equipment with heating liquid comprising:
   a. a storage vessel for storing liquid;
   b. a degasifier in fluid flow communication with the vessel;
   c. means connected to the vessel for heating liquid therein;
   d. first means for passing liquid from the vessel to user equipment;
   e. a gas-liquid separator;
   f. second means for passing liquid from user equipment to the gas-liquid separator;
   g. third means for passing liquid from the gas-liquid separator to the first means;
   h. fourth means for passing liquid and gas from the gas-liquid separator to the degasifier; and
   i. control means for proportioning the liquid flow in the third and fourth means, including temperature responsive means responsive to the temperature of liquid to be introduced into the user equipment through the first means, said control means maintaining a predetermined liquid temperature for the user equipment by increasing and decreasing the liquid flow through the third means in response to increases and decreases respectively, of the temperature of the liquid being introduced into the user equipment.

2. The apparatus as defined in claim 1 wherein the first means includes a pump for raising the pressure of liquid therein, the third means is connected to the lower pressure portion of said first means and said temperature responsive means is responsive to the temperature of liquid in the higher pressure portion of the first means.

3. The apparatus as defined in claim 1 and further comprising an internal storage vessel within the storage vessel said internal storage vessel being in fluid flow communication with the degasifier; a fifth means connecting said internal storage vessel with said third means, said third means, being connected to said storage vessel, whereby liquid is passed from said gas-liquid separator to said first means through said storage vessel; and said first means including a pump to raise the pressure of liquid therein, the lower pressure portion of the first means being connected to said storage vessel, said temperature responsive means being responsive to the temperature of the combined liquid from the gas-liquid separator and said internal storage tank introduced into said storage vessel through said third means.

4. In combination with a rubber-molding press using high-temperature water an apparatus for supplying the mold cavity of the press with high-temperature water comprising:
   a. a vessel for storing liquid;
   b. a degasifier in fluid flow communication with the vessel;
   c. means connected to the vessel for heating liquid therein;
   d. first means for passing liquid from the vessel to the mold cavity;
   e. a gas-liquid separator;
   f. second means for passing liquid from the mold cavity to the gas-liquid separator;
   g. third means for passing liquid from the separator to the first means;
   h. fourth means for passing liquid and gas from the gas-liquid separator to the degasifier;
   i. control means for proportioning the liquid flow in the third and fourth means, including means responsive to the temperature of liquid to be introduced into the mold cavity through the first means, said control means maintaining a predetermined liquid temperature in the first means by increasing and decreasing the liquid flow through the third means in response to increases and decreases respectively, of the temperature of the liquid being introduced into the mold cavity.

5. The apparatus as defined in claim 4 wherein the first means includes a pump for raising the pressure of liquid therein, the third means is connected to the lower pressure portion of said first means and said temperature responsive means is responsive to the temperature of liquid in the higher pressure portion of the first means.

6. The apparatus as defined in claim 4 and further comprising an internal storage vessel within the storage vessel, said internal storage vessel being in fluid flow communication with the degasifier; a fifth means connecting said internal storage vessel with said third means, said third means being connected to said storage vessel, whereby liquid is passed from said gas-liquid separator to said first means through said storage vessel; and said first means including a pump to raise the pressure of liquid therein, the lower pressure portion of the first means being connected to said storage vessel, said temperature responsive means being responsive to the temperature of the combined liquid from the gas-liquid separator and said internal storage tank introduced into said storage vessel through said third means.

7. The apparatus as defined in claim 2 and further comprising sixth means for passing liquid from the vessel to the mold cavity for initially filling the cavity.

8. The apparatus as defined in claim 3 and further comprising: seventh means for returning liquid from the mold cavity to the degasifier.

9. A process for providing user equipment with a circulating hot liquid wherein the hot liquid is obtained from a liquid accumulation zone comprising:
   a. passing a hot liquid to the user equipment;
   b. passing return liquid from the user equipment to a gas-liquid separation zone;
   c. passing a first portion of the liquid and separated gas from the gas liquid separation zone to the accumulation zone;
   d. combining hot liquid from the accumulation zone with a second portion of the return liquid from he gas-liquid separation zone, said hot liquid corresponding in amount to the amount of the first portion;
   e. employing the combined liquor from step (c) in step (a); and
   f. controlling the relative amounts of the first portion and the second portion to maintain he liquid in step (a) at a predetermined temperature.

10. A process for providing the mold cavity of a molding press with hot water to effect a curing cycle wherein the hot water is obtained from a hot water accumulation zone, comprising:
   a. initially filling the mold cavity of the press with hot water from the accumulation zone;
   b. pressurizing hot combined water, as hereinafter defined in step (e), and circulating the pressurized hot combined water to the mold cavity to maintain curing temperature conditions;
   c. returning water from the mold cavity to a gas-liquid separation zone during the curing;
   d. passing separated gas and a first portion of water from the gas-liquid separation zone to a degasifying zone and then returning the degasified water to the accumulation zone;
   e. continuously combining water from the accumulation zone with the second portion of the return liquid from the gas-liquid separation zone during the curing to provide combined hot water, said liquid from the accumulation zone corresponding in amount to the amount of the first portion;
   f. employing the combined hot water from step (e) in step (b); and
   g. controlling the relative amounts of the first and second portions to maintain the pressurized combined hot water circulated to the mold cavity at a predetermined temperature.

11. The process as defined in claim 10 wherein the filling of step (a) is effected by the application of steam pressure to hot water in the accumulation zone.

12. The process as defined in claim 10 wherein the accumulation zone is separated into two zones, the first of said two zones having water at a higher temperature than the second of said two zones, the initial filling of the mold cavity being effected with water from the second of said two zones and the water from the accumulation zone which is combined with the second portion of return liquid being obtained from the first of said two zones.

13. The process as defined in claim 10 wherein steam is introduced into the accumulation zone to maintain the water therein at an elevated temperature.

14. The process as defined in claim 10 and further comprising draining the mold cavity of water after completion of the curing cycle and returning an initial portion of the drained water directly to said accumulation zone.

15. The process as defined in claim 10 and further comprising:
   h. after a predetermined period pressurizing another hot combined water, as hereinafter defined in step (1) and circulating the pressurized another hot combined water to the mold cavity to maintain second curing temperature conditions;
   i. returning water to the gas-liquid separation zone while supplying another pressurized hot combined water to the mold cavity for a predetermined time to return water accumulated while maintaining the first curing temperature;
   j. thereafter returning water from the mold cavity to another gas-liquid separation zone;
   k. passing separated gas and a first portion of water from the another gas-liquid separation zone to a degasifying zone and then returning the degasified water to the accumulation zone;
   l. continuously combining water from the accumulation zone with a second portion of the return liquid from the another gas-liquid separation zone to provide said another combined water, said liquid from the accumulation zone employed to provide said another combined water corresponding in amount to the amount of the first portion for the another gas-liquid separation zone;
   m. employing said another combined water from step (1) in step (h) and
   n. controlling the relative amounts of the first and second portions from the another gas-liquid separation zone to maintain the pressurized another combined hot water circulated to the mold cavity at a second predetermined temperature which maintains the second curing temperature.

16. A process for providing the mold cavity of a press with hot water to effect a curing cycle wherein he hot water is obtained from a hot water accumulation zone, comprising:
   a. initially filling the mold cavity of the press with hot water from the accumulation zone;
   b. pressurizing hot water from the accumulation zone and continuously circulating said hot pressurized water to the mold cavity to maintain first curing temperature conditions and returning water from the cavity for a first portion of the curing cycle;
   c. pressurizing hot combined water, as hereinafter defined in step (g), and circulating during a second portion of the curing cycle the pressurized hot combined water to the mold cavity to maintain second curing temperature conditions;
   d. returning water during an initial portion of the second portion of the curing cycle to the accumulation zone to remove water accumulated in the cavity during the first portion of the curing cycle;
   e. subsequent to said initial portion of the second portion of the curing cycle to the accumulation returning water from the mold cavity to a gas-liquid separation zone;
   f. passing separated gas and a first portion of water from the gas-liquid separation zone to a degasifying zone and then returning the degasified water to the accumulation zone;

g. continuously combining water from the accumulation zone with a second portion of the return liquid from the gas-liquid separation zone to provide combined hot water, said liquid from the accumulation zone corresponding in amount to the amount of the first portion;

h. employing the combined hot water from step (g) in step (c); and controlling the relative amounts of the first and second portions to maintain he pressurized hot water circulated to the mold cavity at a predetermined temperature which maintains the second curing temperature conditions.